United States Patent [19]
Almering et al.

[11] Patent Number: 4,887,007
[45] Date of Patent: Dec. 12, 1989

[54] DC-AC CONVERTER FOR SUPPLYING A GAS AND/OR VAPOUR DISCHARGE LAMP

[75] Inventors: Antonius F. J. Almering, Breda; Henri A. I. Melai, Eindhoven, both of Netherlands

[73] Assignee: U.S. Philips Corporation, New York, N.Y.

[21] Appl. No.: 151,769

[22] Filed: Feb. 3, 1988

[30] Foreign Application Priority Data

Feb. 18, 1987 [NL] Netherlands .................. 8700405

[51] Int. Cl.⁴ .......................................... H05B 37/00
[52] U.S. Cl. .................................... 315/243; 315/175; 315/176; 315/224; 315/307; 315/DIG. 5; 363/98
[58] Field of Search ............... 315/307, 243, 244, 171, 315/172, 173, 174, 175, 176, DIG. 5, 226; 363/17, 98, 132

[56] References Cited

U.S. PATENT DOCUMENTS

| | | | |
|---|---|---|---|
| 4,585,974 | 4/1986 | Stupp et al. | 315/307 |
| 4,698,554 | 10/1987 | Stupp et al. | 315/307 |
| 4,700,113 | 10/1987 | Stupp et al. | 315/307 |
| 4,709,188 | 11/1987 | Roberts | 315/307 |
| 4,717,863 | 1/1988 | Zeiler | 315/244 |
| 4,725,762 | 2/1988 | Jagschitz | 315/307 |
| 4,734,624 | 3/1988 | Nagase et al. | 315/DIG. 5 |
| 4,763,239 | 8/1988 | Ball | 363/98 |

Primary Examiner—Donald J. Yusko
Assistant Examiner—Brian Palladino
Attorney, Agent, or Firm—Bernard Franzblau

[57] ABSTRACT

A DC-AC converter for supplying energy to a discharge lamp (17). The converter is in the form of an imcomplete half-bridge circuit (11, 12; 15, 16, 19, 18). The lamp (17) is connected in series with a coil (18) and a capacitor (16). Two switching elements (11, 12) in the half-bridge circuit are formed as semiconductor switching elements. The lamp current is a square-shaped alternating current. A diode (13) is connected in parallel with the one switching element (11) and a diode (14) is connected in parallel with the other switching element (12). The control circuit of the switching elements is provided with a switching circuit (21) which alternately switches the one switching element (11) and the other switching element (12) several times. The number of switching elements through which the lamp current flows can therefore remain limited to two.

20 Claims, 1 Drawing Sheet

DC-AC CONVERTER FOR SUPPLYING A GAS AND/OR VAPOUR DISCHARGE LAMP

BACKGROUND OF THE INVENTION

This invention relates to a DC-AC converter for supplying a gas and/or vapour discharge lamp, which converter has two input terminals which are connected together by means of a series arrangement of at least two semiconductor switching elements provided with a control circuit, one of the semiconductor switching elements constituting a circuit with a series arrangement of at least a capacitor, the lamp and an inductance in the operating condition of the lamp. The electric arrangement is provided with two rectifiers. An alternating current flows through the lamp in the operating condition, said current, plotted against time, having at least approximately a square-shaped variation.

A known DC-AC converter of this type is described, for example, in EP No. 63,284 (FIG. 8). The undimmed lamp situation is concerned in this case. In this known converter the semiconductor switching elements alternately convey the lamp current in the operating condition.

A drawback of this known converter is that a third semiconductor switching element is present which also conveys the lamp current in the operating condition. This additional switching element connected in the circuit through which the lamp current flows makes this DC-AC converter complicated.

SUMMARY OF THE INVENTION

It is an object of the invention to provide a DC-AC converter of the type described in the opening paragraph in which the circuit through which the lamp current flows is relatively simple.

According to the invention, a DC-AC converter for supplying a gas and/or vapour discharge lamp of the type described in the opening paragraph is therefore characterized in that the one rectifier is connected parallel to the first semiconductor switching element and the other rectifier is connected parallel to the second semiconductor switching element, and in that the control circuit comprises a switching element having two operating states. The control circuit in the first operating state renders the second switching element conductive and non-conductive more than once when the first switching element is non-conductive and in the second operating state renders the first switching element conductive and non-conductive more than once when the second switching element is non-conductive.

An advantage of this DC-AC converter is that the circuit through which the lamp current flows—in the operating condition—can be relatively simple.

It is to be noted that supplying a gas and/or vapour discharge lamp with an alternating current which, plotted against time, has at least approximately a square-shaped variation at a low frequency (for example, in the range above approximately 40 Hz) has several further advantages. If, for example a low-pressure sodium vapour discharge lamp is supplied in this manner—by means of a converter according to the invention—a high specific luminous flux is obtained which leads to a relatively very high lumen-per-watt value of the combination of the DC-AC converter and a lamp of the latter type connected thereto.

If, for example, a high-pressure metal vapour discharge lamp is supplied in the manner described above, the advantage is obtained that the lamp consumes, to a good approximation, a power having a substantially constant instantaneous value so that reignition peaks are reduced to a great extent as compared with a low-frequency (approximately 50 Hz) sinusoidal current. The lamp then has a high efficiency.

The invention is based on the novel concept that the first—and the second semiconductor switching element of the converter are not only used to give the current through the lamp the low-frequency alternating current character, but also to realize the square shape of this current by means of these elements. This purpose is served inter alia by the switching element in the control circuit of the two semiconductor switching elements.

With the aid of the rectifiers arranged antiparallel, according to the invention, to the relevant switching elements having a rectifying function, the following can be achieved in the operating condition.

When the first switching element is non-conducting, the lamp current—while maintaining its direction—alternately flows through the conducting second switching element and through the rectifier (first rectifier) which is arranged antiparallel to the first switching element. The fact that the current also starts flowing through this rectifier—namely when the second switching element becomes nonconducting—is due to the action of the inductance.

The above-mentioned alternate flow of the lamp current through the second switching element and through the first rectifier, respectively is repeated several times.

The switching element in the control circuit of the two semiconductor switching elements subsequently assumes the other operating state, namely the second operating state. This causes the current through the lamp to change its direction. In fact, the lamp current then flows alternately through the conducting first switching element and through the rectifier (second rectifier) which is arranged antiparallel to the second switching element. The fact that the current also starts flowing through this rectifier is again due to the action of the inductance. Also, the last mentioned alternate flow is repeated several times. Subsequently the switching element in the control circuit acquires its first operating state, etc.

Actually the instantaneous current through the lamp increases if this current also flows through one of the conducting switching elements. The instantaneous current through the lamp decreases if this current—in a subsequent period—also flows through one of the antiparallel-arranged rectifiers.

The approximate square-shaped variation of the lamp current is obtained by rendering the second semiconductor switching element—repeatedly—conducting if the current through the first rectifier has not yet become zero and by rendering the first semiconductor switching element—repeatedly—conducting if the current through the second rectifier has not yet become zero. This is made possible, for example, by choosing the capacitance of the capacitor to be sufficiently large and by using a frequency above approximately 40 Hz. At lower frequencies the capacitance of the capacitor becomes too large for a practical embodiment.

The square-shaped alternating current character of the lamp current is obtained by means of the switching element in the control circuit of the two switching element having a rectifying function.

It is to be noted that supplying a discharge lamp, for example, a low-pressure sodium vapour discharge lamp with an approximately square-shaped current at a low frequency (more than approximately 40 Hz) is known per se, for example, from GB No. 1,490,176. See particularly FIG. 2. A drawback of this known supply is, however, that electrical losses occur in a resistor shunting the lamp. In fact, this causes the lumen/watt value of this known electric arrangement to be relatively small.

The input terminals of the DC-AC converter can be connected together by a subsequent capacitor. It is also feasible for the DC-AC converter to be formed as a full half-bridge circuit. In that case the input terminals of the converter are connected together by means of a series arrangement of the capacitor and an extra capacitor, which capacitors have approximately the same capacitance. The series arrangement of, inter alia, the inductance and the lamp then constitutes the central branch of this half-bridge circuit.

In a preferred embodiment of a DC-AC converter according to the invention, an input of the control circuit is connected to a resistor which forms a part of the series arrangement also comprising the inductance.

An advantage of this preferred embodiment is that the said resistor can be used as a measuring resistor so that the semiconductor switching elements can be switched when the instantaneous current through the resistor, and hence the instantaneous lamp current, reaches a limit value. The value of the lam current can then be kept under control.

In a further preferred embodiment of a DC-AC converter according to the invention, the switching element also has a starting state in which the control circuit renders the two semiconductor switching elements alternately conductive and in which the lamp is shunted by a further capacitor.

An advantage of this preferred embodiment is that the lamp can simply be given an increased voltage for igniting the discharge in this lamp. The reason is that a certain degree of resonance can be realized in the circuit comprising the further capacitor and the previously mentioned inductance. This increased voltage causes the lamp to start in a reliable manner.

BRIEF DESCRIPTION OF THE DRAWINGS

The invention will now be described in greater detail with reference to the accompanying drawing, in which.

DESCRIPTION OF THE PREFERRED EMBODIMENTS

Figure 1:
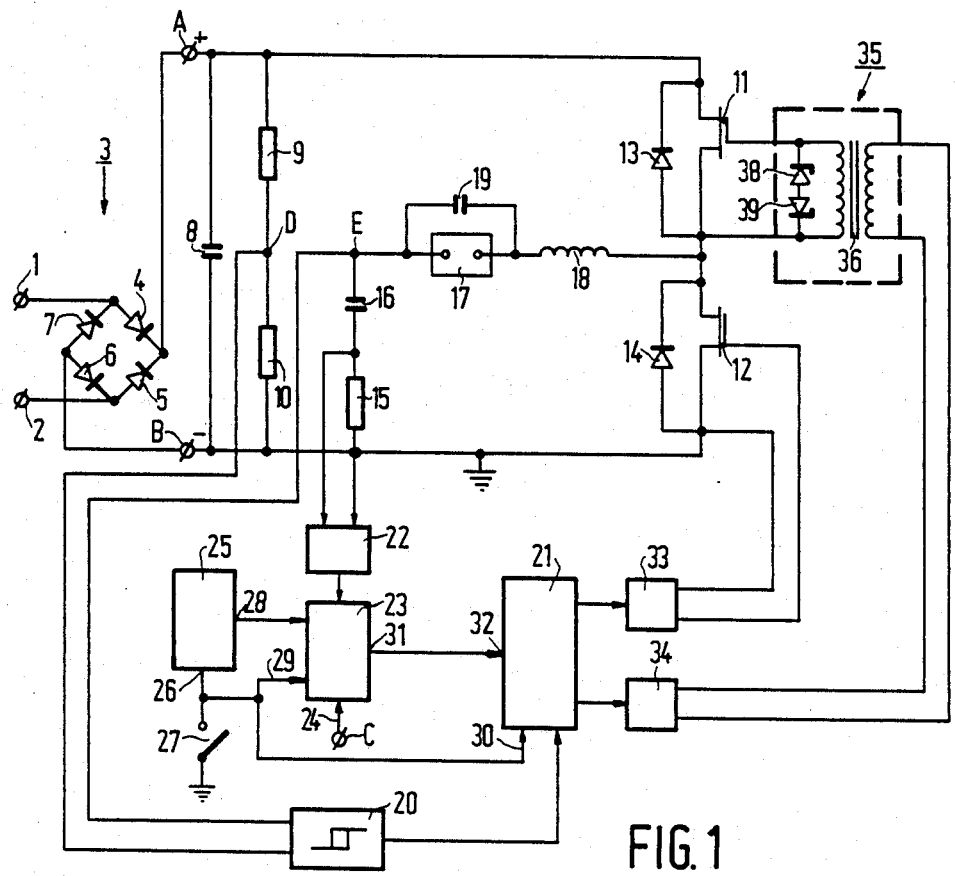
FIG. 1 shows a DC-AC converter according to the invention and a supply circuit for this converter and a discharge lamp to be ignited and supplied by the converter.

In FIG. 1 the supply circuit has two input terminals 1 and 2 intended to be connected to an alternating voltage source of 220 V, 50 Hz. A rectifier bridge 3 having four diodes (4 to 7) is connected to these terminals 1 and 2. An output terminal of the rectifier bridge 3 is connected to a first input terminal (A) of the converter. A second output terminal of the rectifier bridge 3 is connected to an input terminal (B) of the converter.

The converter will now be described. The terminals A and B are connected together by means of a capacitor 8. The capacitor 8 is shunted by a series arrangement of two substantially identical resistors 9 and 10.

The terminals A and B are also connected together by means of a series arrangement of a first semiconductor switching element 11 and a second semiconductor switching element 12. These switching elements are MOS-type transistors.

The transistors 11 and 12 are connected together in such a manner that the source electrode of the transistor 11 is connected to the drain electrode of the transistor 12.

A first rectifier 13 is arranged parallel to the transistor 11. A second rectifier 14 is arranged parallel to the transistor 12.

The second semiconductor switching element, the transistor 12, is part of a circuit that includes a series arrangement of a measuring resistor 15, a capacitor 16, a compact high-pressure mercury vapour discharge lamp 17 and an inductance 18 in the form of a coil. The lamp 17 is shunted by a further capacitor 19.

A control circuit for the transistors 11 and 12 will now be described. For the greater part this circuit is shown as a block diagram in FIG. 1.

A junction point (D) between the resistors 9 and 10 is connected to an input terminal of a hysteresis comparator 20. A junction point (E) between the capacitor 16 and the lamp 17 is connected to a second input terminal of the comparator 20. An output terminal of the comparator 20 is connected to an input terminal of a switching element 21.

Furthermore, the ends of the measuring resistor 15 are connected to an auxiliary voltage sensing element 22 for determining the absolute value of the voltage $|V_{15}|$ across this measuring resistor. The latter voltage is approximately a measure of the absolute value of the current through the lamp 17.

An output of the auxiliary element 22 is connected to an input terminal of a pulse width modulator 23. An input terminal 24 of the said modulator is connected to a first reference voltage C (Ref. 1).

The voltage which is present at point D (between resistors 9 and 10) in the operating condition of this electric arrangement is referred to as a second reference voltage (Ref. 2). The voltage at point E (between capacitors 16 and 19) leads to the other input terminal of comparator 20. $V_E$ is the "measured value". The comparator each time compares $V_E$ with $V_D$ (the Ref. voltage).

The reference numeral 25 denotes a sawtooth oscillator. An input terminal 26 of the oscillator 25 is connected to ground via a switch 27. An output terminal 28 of the oscillator 25 is connected to an input terminal of the pulse width modulator 23.

The terminal 26 is also connected to both a further input terminal 29 of the modulator 23 and to a further input terminal 30 of the switching element 21.

An output terminal 31 of the pulse width modulator 23 is connected to an input terminal 32 of the switching element 21.

The reference numeral 33 denotes a control circuit for the transistor 12. The reference numeral 34 denotes a control circuit for the transistor 11. An output terminal of the switching element 21 is connected to an input terminal of the control circuit 33. A further output terminal of the switching element 21 is connected to an input terminal of the control circuit 34. An auxiliary circuit 35 is present between the control circuit 34 and the transistor 11. This auxiliary circuit 35 is provided with a transformer 36 having electrically insulated windings. This transformer is used to obtain an electrical isolation of the control voltages for the two transistors (11 and 12). A series arrangement of two oppositely connected zener diodes 39 and 38 is present across the secondary winding of the transformer 36. This series arrangement is used to prevent excessively high voltages between the control electrode and the source of the transistor 11.

The circuit described operates as follows. In the one operating state (the so-called second operating state) the transistor 12 is turned off. The transistor 11 is then turned on—and turned off again—for a number of times. During the periods when this transistor 11 is turned on, a current flows from the capacitor 8— charged via the diode bridge 3—via the transistor 11, the coil 18, the lamp 17, the capacitor 16 and the measuring resistor 15 to the other electrode of the capacitor 8. During the periods when the transistor 11 is turned off, the current through the series arrangement 18, 17, 16, 15 maintains its direction. This current then, however, also flows through the rectifier 14. This is due to the action of the coil 18.

The aforementioned currents charge the capacitor 16.

In the other operating state (the so-called first operating state) the transistor 11 is turned off. The transistor 12 is then turned on—and turned off again—for a number of times. During the periods when the transistor 12 is turned on, the capacitor 16 is discharged via the lamp 17, the coil 18, the transistor 12 and the measuring resistor 15. The current through the lamp 17 has then also reversed its direction.

During the periods when the transistor 12 is turned off the discharge of capacitor 16 continues. This is effected via the lamp 17, the coil 18, the rectifier 13 and the measuring resistor 15.

With the aid of the switching element 21 in the control circuit of the transistors 11 and 12, there is a regular change-over to the other operating state. This leads to an alternating current through the lamp 17. Since the instantaneous lamp current maintains a given level during each operating state, the lamp current is at least approximately square-shaped.

The switching element receives several input signals. First, a change of $V_E$-$V_D$ at the input of the comparator 20 via the output of 20 determines whether the capacitor 16 must then be charged or discharged. This also means that the switching element 21 must receive information—via the comparator 20—whether the second operating state or the first operating state is to be realized.

The circuit elements 22, 23 and 25 pass on information as to the required ratio between the conducting time and the non-conducting time during a period of the relevant transistor (11 or 12). This provides a mechanism for keeping the maximum value of the instantaneous lamp current under control.

In order to realize this, the oscillator 25 supplies a signal of a frequency f1 to the pulse width modulator 23 when switch 27 is open. Furthermore, the voltage at the output of the auxiliary element 22 is compared with Ref. 1 at input terminal 24. With the aid of this information f1 is passed on via the terminals 31 and 32 with pulse width such that a given maximum instantaneous value of the lamp current is maintained.

As has been indicated, the current through the lamp reverses its direction via the operation of the comparator 20. The lamp current is stabilized during an operating state via the elements 22, 23 and 25.

Figure 2:
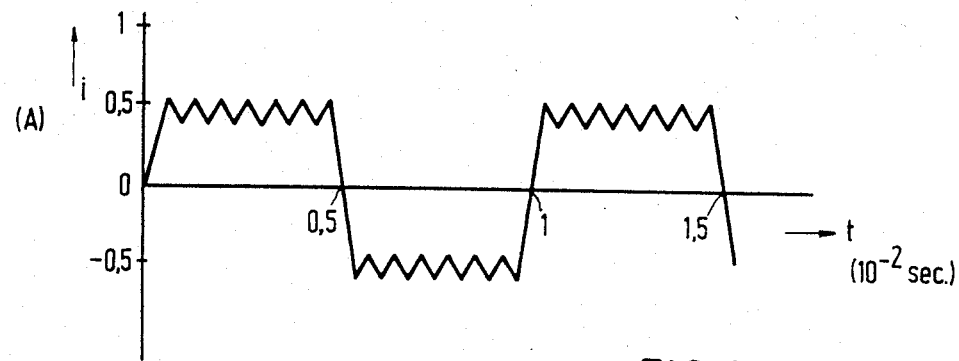
FIG. 2 is a diagrammatic graphic representation of the instantaneous current through the lamp, plotted against time.

FIG. 2 shows the instantaneous lamp current i plotted against time t.

When starting the lamp 17 prior to the operating condition, the switch 27 is closed. The oscillator 25 then supplies a signal of a frequency f2. This signal is passed on as a symmetrical pulse, that it to say with a pulse width of 50% to the switching element 21. The result is that—in this starting state—the transistors 11 and 12 are alternately turned on for an equally long period. The frequency f2 is chosen to be near the resonance frequency of the capacitor 19 and the coil 18. This produces a relatively high electric voltage across the lamp 17 upon starting. This lamp 17 then ignites easily.

In a practical embodiment PWM 21 is composed of a number of standard logic circuits (for example, CMOS HE 4000 B as described in Philips Data Handbook IC 04, 1986).

The control circuits 33 and 34 are substantially the same and are of a type also described in the said Handbook. The elements 20, 22, 23, 25, 21, 33, 34 can be formed as an integrated circuit.

In that case:
capacitor 8 has a value of approximately 100° F.,
capacitor 16 is approximately 45° F.,
and capacitor 19 is approximately 27 nF;
and coil 18 is approximately 15 mH.

The starting frequency f2 is approximately 8 kHz.

The operating frequency f1 is approximately 80 kHz. Due to the said hysteresis there is produced a square-wave current frequency for the lamp current of approximately 100 Hz, that is to say to a frequency which is larger than 40 Hz.

It is to be noted that in a possible further embodiment a control signal for a semiconductor switching element having a rectifying function has no effect at an instant when a current still flows through the rectifier arranged in parallel with this switching element.

An advantage of the circuit described is that, except for the switching elements 11 and 12, there are no further switching elements through which the current of the lamp 17 flows in the operating condition.

The direct voltage between the points A and B could also be supplied by an auxiliary device which is supplied from a battery of a vehicle, for example, a motor car.

What is claimed is:

1. A DC-AC converter for supplying a gas and/or vapour discharge lamp comprising: two input terminals for connection to a source of supply voltage, means connecting a series arrangement of at least first and second semiconductor switching elements across said two input terminals, means connecting one of the semiconductor switching elements in a series circuit with a capacitor, the lamp and an inductance across said input terminals in the lamp operating condition, an approximately square-shaped alternating current flowing through the lamp in the operating condition, characterized in that a first rectifier is connected parallel to the first semiconductor switching element and a second rectifier is connected parallel to the second semiconductor switching element, the cathodes of the rectifiers being connected to that electrode of its parallel semiconductor switching element which has the highest voltage during operation, and a control circuit which comprises a switching element coupled to said first and second semiconductor switching elements, said switching element having two operating states, the control circuit in the first operating state rendering the second semiconductor switching element conducting and non-conducting more than once while the first semiconductor switching element is non-conducting and in the second operating state rendering the first semiconductor switching element conducting and non-conducting more than once while the second semiconductor switching element is non-conducting.

2. A DC-AC converter as claimed in claim 1, characterized in that an input of the control circuit is connected to a resistor and in that said resistor forms part of the series circuit which includes the inductance.

3. A DC-AC converter as claimed in claim 2, characterized in that the switching element also has a starting state in which the control circuit alternately renders the first and second semiconductor switching elements conducting, and further capacitor in shunt with the lamp.

4. A DC-AC converter as claimed in claim 1, wherein the switching element also has a starting state in which the control circuit alternately renders the first and second semiconductor switching elements conducting at a given starting frequency, and a further capacitor connected in shunt with the lamp and forming an approximately resonant circuit with said inductance at said starting frequency.

5. A DC-AC converter as claimed in claim 1, wherein said DC-AC converter comprises a half-bridge circuit that includes said first and second semiconductor switching elements as the only semiconductor switching elements through which lamp current flows.

6. A DC-AC converter as claimed in claim 1, wherein said DC-AC converter is devoid of a second capacitor in series with the first capacitor across the two input terminals whereby the first capacitor is the only capacitor active in said DC-AC converter in the lamp operating condition.

7. A DC-AC converter as claimed in claim 1, wherein said one semiconductor switching element is the first semiconductor switching element, said capacitor receiving electric energy from said input terminals via the first semiconductor switching element, the inductance and the lamp during said second operating state and being the primary source of electric energy for the lamp in the first operating state, said second semiconductor switching element in the first operating state providing a discharge path for the capacitor that includes the lamp and the inductance whereby current flows through the lamp in a direction opposite to the direction of lamp current in the second operating state.

8. A DC-AC converter as claimed in claim 1 wherein said DC-AC converter comprises a half-bridge circuit that includes said first and second semiconductor switching elements connected to said input terminals such that in the second operating state the capacitor receives electric energy from said input terminals via the first semiconductor switching element and in the first operating state the second semiconductor switching element is effectively isolated from said input terminals so that electric energy does not flow from said input terminals through the second semiconductor switching element or the lamp during said first operating state.

9. A circuit for supplying an electric discharge lamp with an approximately square wave alternating current from a DC energy source comprising:
first and second input terminals for connection to a source of DC supply voltage,
first and second semiconductor switching elements connected in series across said input terminals,
means connecting an inductor, a discharge lamp and a capacitor in a series circuit between a junction point of said first and second semiconductor switching elements and said second input terminal,
first and second rectifiers connected in anti-parallel with said first and second semiconductor switching elements, respectively, and
a switching control circuit coupled to respective control electrodes of the first and second semiconductor switching elements, said control circuit including a switching element having first and second operating states in which the first and second semiconductor switching elements are alternately switched on and off at a relatively low frequency in mutually exclusive time intervals, said control circuit repetitively driving said second semiconductor switching element on and off at a relatively high frequency during the first operating state in which the first semiconductor switching element is cut-off and vice versa during the second operating state when the second semiconductor switching element is cut-off, whereby an approximately square wave alternating current flows through the discharge lamp.

10. A circuit as claimed in claim 9 wherein said control circuit includes means responsive to lamp voltage for controlling said switching element to switch between said first and second operating states at said relatively low frequency.

11. A circuit as claimed in claim 10 wherein said control circuit further comprises a high frequency pulsatory signal source having an output coupled to an input of said switching element and means responsive to lamp current for controlling the pulse width of pulsatory signals supplied by said signal source to said switching element, said high frequency signal source controlling the high frequency switching of said first and second semiconductor switching elements via said switching element.

12. A circuit as claimed in claim 9 wherein said control circuit further comprises a high frequency pulsatory signal source having an output coupled to an input of said switching element and means responsive to lamp current for controlling the pulse width of pulsatory signals supplied by said signal source to said switching element, said high frequency signal source controlling the high frequency switching of said first and second semiconductor switching elements via said switching element.

13. A circuit as claimed in claim 9 further comprising a further series circuit of first and second impedance elements connected in parallel with the series combination of said first and second semiconductor switching elements, and
means coupling a junction of said first and second impedance elements to a control input of the control circuit whereby a voltage developed at said junction operates as a reference voltage for control of said switching element at said relatively low frequency.

14. A circuit as claimed in claim 9 forming a half-bridge circuit coupled to said input terminals wherein in the second operating state the capacitor receives electric energy from said input terminals via the first semiconductor switching element and in the first operating state the second semiconductor switching element is effectively isolated from said input terminals so that electric energy does not flow from said input terminals through the second semiconductor switching element or the lamp during said first operating state.

15. A circuit as claimed in claim 14 wherein substantially all of the lamp current flows through said capacitor during each of said first and second operating states.

16. A circuit as claimed in claim 9 forming a half-bridge circuit coupled to said input terminals wherein substantially all of the lamp current flows through said capacitor during each of said first and second operating states.

17. A circuit as claimed in claim 16 wherein in the first operating state the second semiconductor switching element is effectively isolated from said input terminals so that said capacitor is then the primary source of current for the lamp.

18. A circuit as claimed in claim 9 further comprising a second capacitor connected in parallel with the discharge lamp, and switching means coupled to said control circuit for establishing a starting state for the circuit in which the control circuit alternately drives the first and second semiconductor switching elements on and off at a given starting frequency higher than said low frequency, and wherein said second capacitor and said inductor form an approximately series resonant circuit at said starting frequency for producing a high ignition voltage for the lamp during lamp start-up.

19. A circuit as claimed in claim 9 wherein the low frequency is at least 40 Hz. and the capacitor has a capacitance sufficiently large at said low frequency to insure production of an approximately square wave alternating current for the discharge lamp.

20. A circuit as claimed in claim 9 wherein said control circuit includes means for comparing lamp voltage with a DC reference voltage to provide a control signal for controlling said switching element to switch between said first and second operating states at said relatively low frequency.

* * * * *